United States Patent Office 3,339,480
Patented Sept. 5, 1967

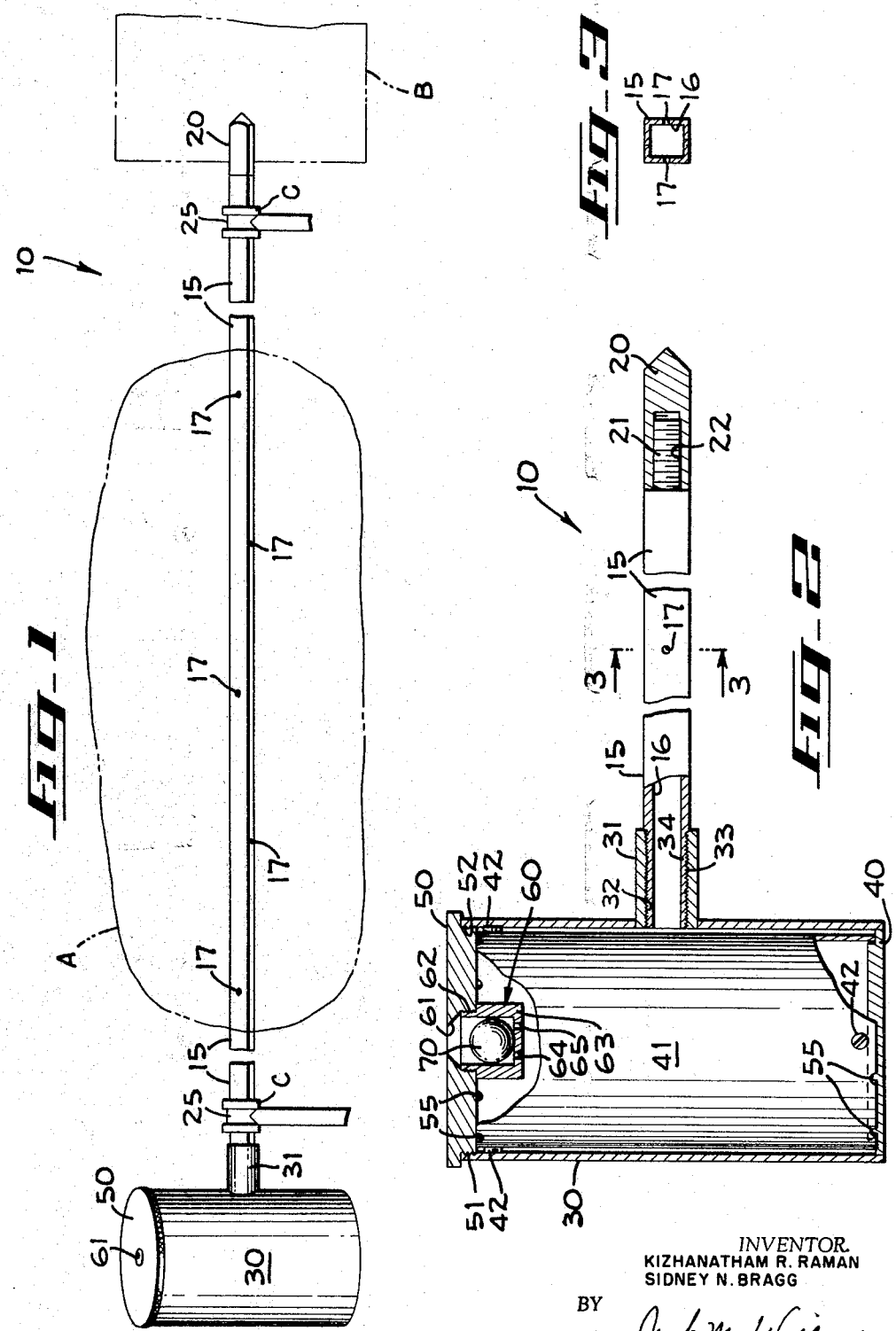

3,339,480
COOKING APPARATUS
Kizhanatham R. Raman, 834 Sutter Ave., Palo Alto, Calif. 94303, and Sidney N. Bragg, 187 Acalanes, Apt. 2, Sunnyvale, Calif. 94086
Filed Nov. 12, 1965, Ser. No. 507,453
6 Claims. (Cl. 99—421)

ABSTRACT OF THE DISCLOSURE

A hollow, rotatable spit has food impaled thereon. A plurality of openings are formed in the spit so that flavoring fluid may be discharged into the food impaled on the spit. At one end of the spit is disposed a housing for rotation therewith. Flavoring fluid is stored in a tube located in the housing, which communicates with the channel of the hollow spit through the housing. The tube is disposed in the housing with a diameter slightly less than the diameter of the housing to leave a relatively small space therebetween. The space between the tube and the housing is so dimensioned that a thin viscus layer of fluid is disposed in an annular space therebetween. An air vent valve provides ventilation in the housing to expose the flavoring fluid stored in the tube to atmospheric pressure. From the foregoing, a supply of flavoring fluid is stored in the tube which advances to the annular space between the tube and the housing. The flavoring fluid then flows into the channel of the hollow spit from the annular space through the housing to be discharged from the openings of the spit into the food impaled on the rotating spit. The flavoring fluid so discharged from the openings of the spit into the food impaled thereon is drawn through the openings in the spit into the food to replace the fat and liquid content of the food drawn to the exposed surface of the food.

The present invention relates in general to cooking apparatus for imparting flavoring fluids to food during the cooking operation.

An object of the present invention is to provide an improved apparatus for imparting flavoring fluids to food while the food is being cooked.

Another object of the present invention is to provide an apparatus for imparting flavoring fluids to food while supporting the food for rotation during the cooking operation.

Another object of the present invention is to provide an apparatus for marinating meat while supporting the meat for rotation during the cooking operation.

Other and further objects and advantages of the present invention will be apparent to one skilled in the art from the following description taken in conjunction with the accompanying drawings, in which:

FIG. 1 is a fragmentary, perspective view of the cooking apparatus of the present invention shown with food impaled thereon.

FIG. 2 is an enlarged, fragmentary vertical sectional view, partially in elevation, taken along the longitudinal axis of the cooking apparatus shown in FIG. 1.

FIG. 3 is a vertical sectional view taken along line 3—3 of FIG. 2.

Illustrated in FIGS. 1 and 2 is the cooking apparatus 10 of the present invention, which comprises a hollow spit 15 that has food, such as meat A, impaled thereon. In the preferred embodiment, the spit 15 has a square cross-sectional area defined by four longitudinally extending walls and a longitudinally extending channel 16.

Formed through the respective longitudinally extending walls of the spit 15 are a plurality of discharge openings or ports 17 that communicate with the channel 16.

The openings 17 appear in all four walls of the spit 15 and are spaced longitudinally therealong. Thus, fluid in the channel 16 would advance through the openings 17 for discharge outwardly of the spit 15 into the food impaled thereon.

At one end of the spit 15 is a shaft 20 that is disposed in threaded engagement with the spit 15. For this purpose, the spit 15 has a threaded reduced projection 21 that is received by a threaded wall surrounding the bore 22 formed in the shaft 20. The shaft 20 serves to block the channel 16 at one end of the spit 15 and, also, serves to impart rotation to the spit 15. Any suitable drive means B may be provided to impart rotation to the shaft 20, such as an electric motor with a rotating disc or block. Each end of the spit 15 has a recessed cylindrical surface 25, which may be received by a bearing or any suitable journal C for supporting the spit 15 for rotation.

Secured to the other end of the spit 15 for rotation therewith is a cylindrical housing 30 having a tubular collar 31 projecting radially outward therefrom midway between the ends thereof. The collar 31 has a bore 32 surrounded by a threaded wall 33 which receives in threaded engagement a reduced threaded end 34 of the spit 15. Thus, the channel 16 of the spit 15 is in communication with the cylindrical housing 30 through the bore 32 of the collar 31.

One end of the cylindrical housing 30 is closed by a fixedly secured disc 40. Disposed within the housing 30 is a tube 41 that has a diameter less than the diameter of the housing 30 so as to leave a relatively small space between the inner surface of the housing 30 and the outer surface of the tube 41. The space between the housing 30 and the tube 41 is so dimensioned that a thin viscous layer of flavoring fluid may be disposed in the annular space between the outer surface of the tube 41 and the inner surface of the housing 30. To minimize the radial movement of the tube 41 within the housing 30, projections 42 on the outer wall of the tube 41 engage the inner surface of the housing 30.

At the other end of the housing 30 is mounted a removable cap 50 having a knurled cylindrical wall. Below the knurled cylindrical wall, the cap 50 includes a reduced diameter threaded wall 51 that is received in threaded engagement by a internally threaded wall 52 of the housing 30. The cap 50 engages the adjacent end of the tube 41 to restrict axial movement thereof within the housing 30. Openings 55 are formed at each end of the tube 41 to permit flavoring fluid stored within the tube 41 to pass from the tube 41 into the space between the tube 41 and the housing 30.

Carried by the cap 50 is an air-vent valve 60 (FIG. 2) which serves to provide ventilation to the housing 30 and exposes the flavoring fluid stored within the tube 41 to atmospheric pressure during each cycle of rotation of the spit 15. Toward this end, a suitable opening 61 is formed in the cap 50 and extends therethrough. A threaded wall 62 surrounds the lower portion of the opening 61. Supported by and depending from the cap 50 in threaded engagement with the threaded wall 62 is a valve body 63. Formed in the valve body 63 are air discharge ports 64 and 65. Disposed in the valve body 63 is a ball or spherical object 70, such as a stainless steel ball bearing. The diameter of the ball 70 is slightly larger than the tapered wall surrounding the upper portion of the opening 61 in the cap 50.

When the housing 30 is in the position shown in FIGS. 1 and 2, the air-vent valve 60 is open exposing the interior of the housing 30 to atmospheric pressure. When the housing 30 is rotated in the vicinity of 180 degrees from the position shown in FIGS. 1 and 2, the ball 70 seats against the tapered wall of the cap 50 to close the air-vent valve 60 and thereby prevents the escape of flavoring fluid from the housing 30.

In the operation of the cooking apparatus 10, the cap 50 is first removed from the housing 30. Thereupon, a flavoring fluid, such as a marinating fluid is disposed within the tube 41 and passes to the annular space between the outer wall of the tube 41 and the inner surface of the housing 30. The space between the outer wall of the tube 41 and the inner surface of the housing 30 is so dimensioned that a thin viscous layer is located in the annular space defined by the outer surface of the tube 41 and the inner surface of the housing 30.

Thereupon, the cap is secured in threaded engagement with the housing 30. Food, such as meat A, is now impaled on the spit 15 from the end of the spit 15 having the shaft 20 secured thereto. The shaft 20 is now connected to the drive mechanism B and the end of the spit 15 adjacent the housing 30 is supported for rotation by the bearings or journal support C. The drive mechanism B is now operated to rotate the spit 15 about its longitudinal axis through the shaft 20.

While the spit 15 is rotating, the supply of flavoring fluid stored in the annular space between the tube 41 and the housing 30 flows through the bore 32 of the collar 31 into the longitudinal channel 16 of the spit 15. The air-vent valve 60 in a manner previously described exposes the flavoring fluid contained in the tube 41 to atmospheric pressure during each revoluation of the spit 15.

From the foregoing, a constant supply of flavoring fluid is discharged from the ports 17 of the spit 15 into the meat A impaled on the continuously rotating spit 15 during the cooking operation of the meat A. As the meat A slowly rotates over the heat source, the fat and liquid contents of the meat A are drawn to the exposed surface of the meat A. As a consequence thereof, the flavoring fluid is drawn from the annular space between the tube 41 and the housing 30 into the bore 32 of the collar 31 and then into the longitudinal channel 16 of the spit 15 and then drawn through the discharge ports 17 into the meat A to replace the fat and liquid content of the meat A drawn to the exposed surface thereof. The just described action is achieved through a suction force created by the fat and liquid content of the meat A being drawn off through the exposed surface of the meat A while the meat A is subject to the heat source and in conjunction the viscous layer within the annular space between the tube 41 and the housing 30.

Substantially all the components herein employed in the cooking apparatus 10 of the present invention are made from stainless steel.

It is to be understood that modifications and variations of the embodiment of the invention disclosed herein may be resorted to without departing from the spirit of the invention and the scope of the appended claims.

Having thus described our invention, what we claim as new and desire to protect by Letters Patent is:

1. A cooking apparatus comprising a spit, said spit being formed with a channel therein for the passage of flavoring fluid, said spit being formed with a plurality of openings therein communicating with said channel for the discharge of flavoring fluid into food impaled on said spit, means for imparting rotary movement to said spit, a housing connected to said spit in communication with said channel, and a tube disposed within said housing to form a relatively small annular space between said tube and said housing, said flavoring fluid being stored in said tube for passage into said annular space and from said annular space into said channel through said housing.

2. A cooking apparatus as claimed in claim 1 wherein an air vent is carried in said housing to expose said flavoring fluid stored in said tube to atmospheric pressure.

3. A cooking apparatus as claimed in claim 2 wherein said tube is formed with an opening to enable said flavoring fluid to flow from said tube into said annular space.

4. A cooking apparatus as claimed in claim 3 wherein the loss of fat and liquid from the food impaled on said spit during the cooking operation draws the flavoring fluid from said annular space into said channel and from said channel through said openings formed in said spit and into said food.

5. A cooking apparatus as claimed in claim 2 wherein said air vent is a gravity controlled valve operative for exposing said flavoring fluid stored in said tube to atmospheric pressure during each revolution of said spit.

6. A cooking apparatus as claimed in claim 5 wherein said gravity controlled valve comprises a ball that is temporarily unseated during the rotation of said spit for exposing said flavoring fluid stored in said tube to atmospheric pressure.

References Cited

UNITED STATES PATENTS

| | | | |
|---|---|---|---|
| 1,819,301 | 8/1931 | Noble | 99—421 X |
| 2,059,666 | 11/1936 | Thompson | 99—421 X |
| 2,602,391 | 7/1952 | Pedranti et al. | 99—256 X |
| 2,821,904 | 2/1958 | Arcabissi | 99—419 X |
| 2,888,872 | 7/1959 | Bathe | 99—421 X |

WILLIAM I. PRICE, *Primary Examiner.*

J. M. NEARY, *Assistant Examiner.*